United States Patent
Kang et al.

(10) Patent No.: US 12,251,944 B2
(45) Date of Patent: Mar. 18, 2025

(54) MENISCUS MEASURING APPARATUS AND METHOD, SUBSTRATE PROCESSING APPARATUS

(71) Applicant: SEMES CO., LTD., Chungcheongnam-do (KR)

(72) Inventors: Han Lim Kang, Seoul (KR); Suk Won Jang, Gyeonggi-do (KR); Jae Duck Lee, Gyeonggi-do (KR); Won Yong Jin, Jeollabuk-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 225 days.

(21) Appl. No.: 17/885,552

(22) Filed: Aug. 11, 2022

(65) Prior Publication Data
US 2023/0063647 A1 Mar. 2, 2023

(30) Foreign Application Priority Data
Aug. 24, 2021 (KR) .......................... 10-2021-0111858

(51) Int. Cl.
*B41J 2/21* (2006.01)
*G01B 11/24* (2006.01)
(52) U.S. Cl.
CPC ............. *B41J 2/2139* (2013.01); *G01B 11/24* (2013.01)

(58) Field of Classification Search
CPC .... B41J 2/04581; B41J 2/2142; B41J 2/2139; B41J 2/04505; B41J 2/175; B41J 2/17; G01B 11/0608; G01B 11/08; G01B 11/24
See application file for complete search history.

(56) References Cited

FOREIGN PATENT DOCUMENTS

| | | |
|---|---|---|
| JP | 2005-177708 | 7/2005 |
| JP | 2007-216461 | 8/2007 |
| JP | 2011-501435 | 1/2011 |
| KR | 10-2011-0001445 | 1/2011 |
| KR | 10-2016-0083420 | 7/2016 |
| KR | 10-2018-0018446 | 2/2018 |
| KR | 10-2021-0006223 | 1/2021 |

OTHER PUBLICATIONS

Office Action dated Aug. 7, 2023 for Korean Patent Application No. 10-2021-0111858 and its English translation from Global Dossier.

*Primary Examiner* — Jannelle M Lebron
(74) *Attorney, Agent, or Firm* — WOMBLE BOND DICKINSON (US) LLP

(57) ABSTRACT

A meniscus measuring method capable of quickly and accurately measuring meniscus positions in a plurality of nozzles of an inkjet head can be provided. The meniscus measuring method comprises providing a head unit capable of discharging ink through a plurality of nozzles, adhering ink remaining in the plurality of nozzles to a film to form a detection pattern on the film by bringing the film into close contact with the plurality of nozzles, measuring meniscus of ink remaining in the plurality of nozzles based on the detection pattern.

20 Claims, 7 Drawing Sheets

Fig. 11 ered in the drawings. For example, when inverting an element shown in the drawing, an element described as "below" or "beneath" another element may be placed "above" the other element. Accordingly, the exemplary term "below" may include both downward and upward directions. Elements may also be oriented in different directions, and thus spatially relative terms may be interpreted according to the orientation.

MENISCUS MEASURING APPARATUS AND METHOD, SUBSTRATE PROCESSING APPARATUS

This application claims the benefit of Korean Patent Application No. 10-2021-0111858, filed on Aug. 24, 2021, in the Korean Intellectual Property Office, the disclosure of which is incorporated herein by reference in its entirety.

BACKGROUND

1. Field

The present invention relates to a meniscus measuring apparatus and method, and a substrate processing apparatus.

2. Description of the Related Art

A printing process (e.g., RGB patterning) is performed on a substrate to manufacture a display device such as an LCD panel, a PDP panel, or an LED panel. Through the inkjet printing method, ink may be discharged onto the substrate. The ejection characteristics of ink discharge are determined by the pressure distribution of the nozzles of the inkjet head and the physical characteristics of the ink. In particular, the position of the meniscus in the nozzle of the inkjet head is one of the key factors determining the ejection characteristics.

SUMMARY

An object of the present invention is to provide a meniscus measuring method capable of quickly and accurately measuring meniscus positions in a plurality of nozzles of an inkjet head.

Another object of the present invention is to provide a meniscus measuring apparatus capable of quickly and accurately measuring meniscus positions in a plurality of nozzles of an inkjet head.

Another object of the present invention is to provide a substrate processing apparatus for adjusting a voltage for discharging ink from a plurality of nozzles by using the meniscus measured using the meniscus measuring method.

The objects of the present invention are not limited to the objects mentioned above, and other objects not mentioned will be clearly understood by those skilled in the art from the following description.

One aspect of the meniscus measuring method of the present invention for achieving the above technical object comprises providing a head unit capable of discharging ink through a plurality of nozzles, adhering ink remaining in the plurality of nozzles to a film to form a detection pattern on the film by bringing the film into close contact with the plurality of nozzles, measuring meniscus of ink remaining in the plurality of nozzles based on the detection pattern.

One aspect of the meniscus measuring apparatus of the present invention for achieving the above technical object comprises a base member; a pressure sensor installed on the base member; and a film installed on the pressure sensor, wherein the film is in close contact with a plurality of nozzles of a head unit so that ink remaining in the plurality of nozzles is adhered to the film to form a detection pattern on the film.

One aspect of the substrate processing apparatus of the present invention for achieving the above another technical object comprises a head unit capable of discharging ink through a plurality of nozzles; a measuring unit including a film for measuring a meniscus of ink remaining in the plurality of nozzles; and a control module for controlling the head unit or the measuring unit to bring the film into close contact with the plurality of nozzles, adhering ink remaining in the plurality of nozzles to the film to form a detection pattern on the film, and calculating a meniscus of ink remaining in the plurality of nozzles based on the detection pattern.

The details of other embodiments are included in the detailed description and drawings.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, preferred embodiments of the present disclosure will be described in detail with reference to the accompanying drawings. Advantages and features of the present disclosure and methods of achieving them will become apparent with reference to the embodiments described below in detail in conjunction with the accompanying drawings. However, the present disclosure is not limited to the embodiments described below, but may be implemented in various different forms, and these embodiments are provided only for making the description of the present disclosure complete and fully informing those skilled in the art to which the present disclosure pertains on the scope of the present disclosure, and the present disclosure is only defined by the scope of the claims. Like reference numerals refer to like elements throughout.

Spatially relative terms "below," "beneath," "lower," "above," and "upper" can be used to easily describe a correlation between an element or components and other elements or components. The spatially relative terms should be understood as terms including different orientations of the device during use or operation in addition to the orientation shown in the drawings. For example, when an element shown in the figures is turned over, an element described as "below" or "beneath" another element may be placed "above" the other element. Accordingly, the exemplary term "below" may include both directions below and above. The device may also be oriented in other orientations, and thus spatially relative terms may be interpreted according to orientation.

Although first, second, etc. are used to describe various elements, components, and/or sections, it should be understood that these elements, components, and/or sections are not limited by these terms. These terms are only used to distinguish one element, component, or section from another element, component, or section. Accordingly, the first element, the first component, or the first section mentioned below may be the second element, the second component, or the second section within the technical spirit of the present disclosure.

Figure 1:
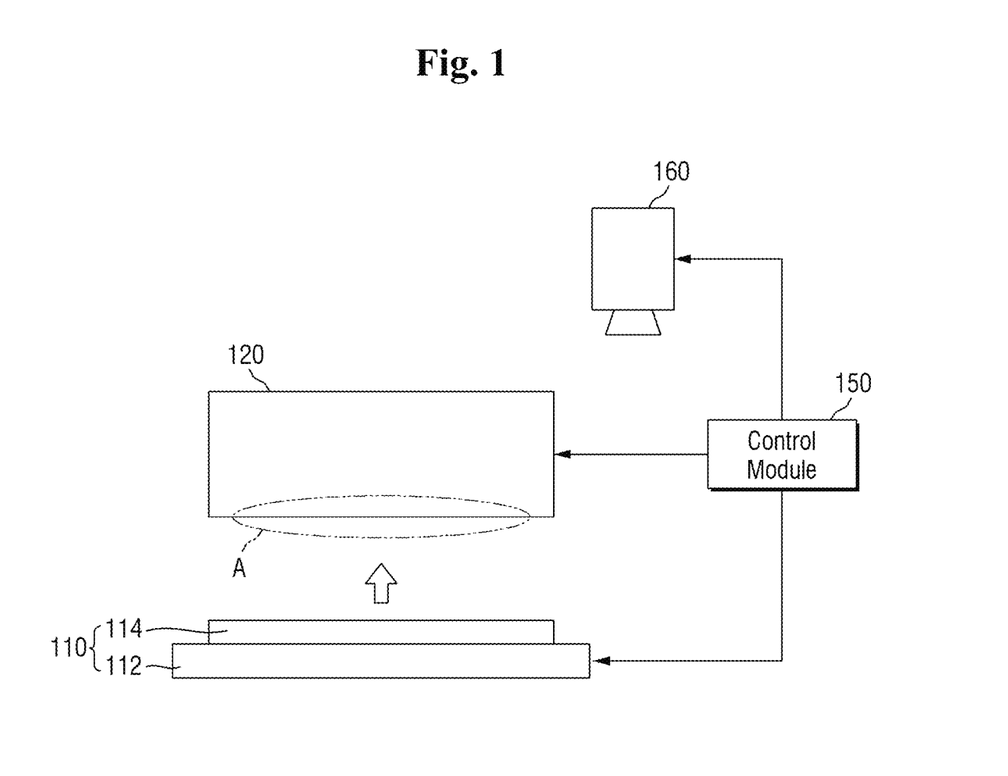
FIG. 1 is a conceptual diagram illustrating a substrate processing apparatus according to an embodiment of the present invention.
Figure 2:
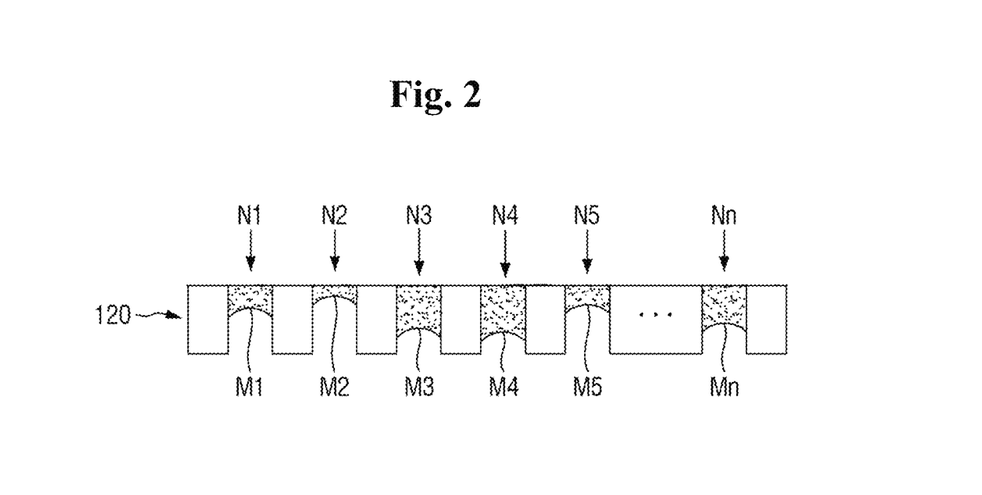
FIG. 2 is an enlarged view of region A of FIG. 1.

FIG. 1 is a conceptual diagram illustrating a substrate processing apparatus according to an embodiment of the present invention. FIG. 2 is an enlarged view of region A of FIG. 1.

Referring first to FIG. 1, a substrate processing apparatus according to an embodiment of the present invention comprises a meniscus measuring unit 110, a head unit 120, a control module 150, an image generating unit 160, and the like.

The meniscus measuring unit 110 comprises a base member 112 and a film 114. The base member 112 is a member for fixing the film 114, and may have an overall flat shape.

The film 114 may be an absorbent material capable of absorbing the ink remaining in the plurality of nozzles. Alternatively, the film 114 may be a water-repellent coated, so that the ink remaining in the plurality of nozzles is not absorbed. However, when the ink remaining in the plurality of nozzles is adhered to the film 114, the film 114 may be coated with a material, in which the adhered ink does not easily spread to the surroundings. When the film 114 is an absorbent material, it is difficult to use it multiple times, but if the film 114 is a water-repellent coated, it may be reused after surface cleaning.

The image generating module 160 is for photographing the ink (i.e., the detection pattern) adhered to the film 114. The image generating module 160 may include a camera, but is not limited thereto.

The head unit 120 may include at least one pack, each pack may include a plurality of heads, and each head may include a plurality of nozzles.

Referring to FIG. 2, the head unit 120 includes a plurality of nozzles (N1 to Nn, where n is a natural number). Ink may remain in each of the nozzles N1 to Nn. The height of the meniscus M1 to Mn of the ink remaining in each of the nozzles N1 to Nn may not be constant. For example, the meniscus M2 of the second nozzle N2 and the meniscus M5 of the fifth nozzle N5 may be relatively high, and the meniscus M3 of the third nozzle N3 and the meniscus M4 of the fourth nozzle N4 may be relatively low.

Figure 3:
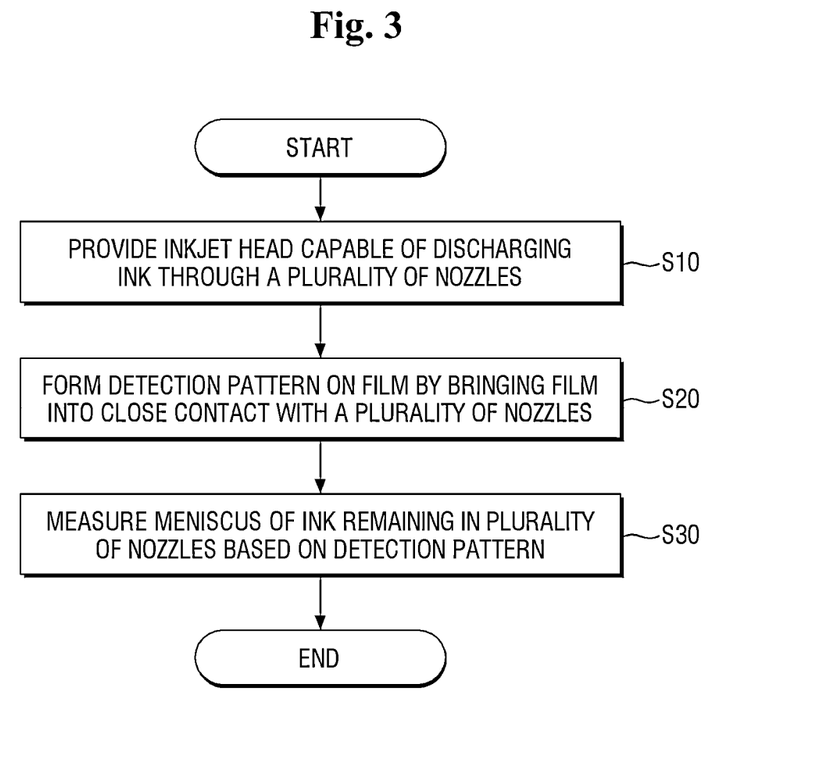
FIG. 3 is a flowchart illustrating a meniscus measuring method according to an embodiment of the present invention.
Figure 4:
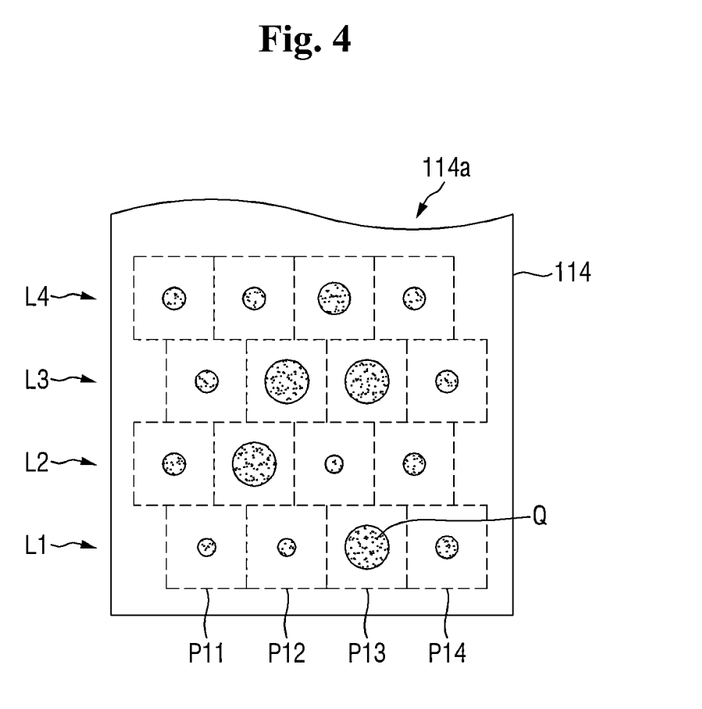
FIG. 4 is a view for describing a detection pattern formed on a film.
Figure 5:
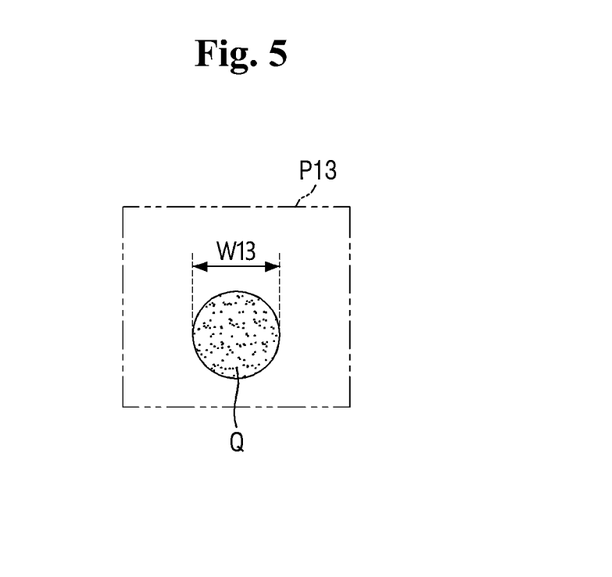
FIG. 5 is a diagram for describing step S30 of FIG. 3.

FIG. 3 is a flowchart illustrating a meniscus measuring method according to an embodiment of the present invention. FIG. 4 is a view for describing a detection pattern formed on a film. FIG. 5 is a diagram for describing step S30 of FIG. 3.

Referring to FIGS. 1 and 3, an inkjet head (i.e., the head unit 120) capable of discharging ink through a plurality of nozzles is provided (S10). That is, the substrate processing apparatus of FIG. 1 is provided. The meniscus measuring unit 110 of the substrate processing apparatus includes a base member 112 and a film 114.

Next, the film 114 is brought into close contact with the plurality of nozzles (N1 to Nn in FIG. 2), so that the ink remaining in the plurality of nozzles N1 to Nn is adhered to the film 114 to form the detection pattern on the film 114 (see 114a of FIG. 4) (S20).

Specifically, the base member 112 of the meniscus measuring unit 110 presses the head unit 120 with a uniform force (or pressure) on the entire surface. In a state where the top surface of the base member 112 and the bottom surface of the head unit 120 face each other, and the top surface of the base member 112 and the bottom surface of the head unit 120 are parallel to each other, the base member 112 and the head unit 120 may be in contact. By the force of the base member 112 pressing the head unit 120, the film 114 may be into contact with the ink remaining in the plurality of nozzles N1 to Nn. Accordingly, an ink mark (Q in FIG. 4) is formed on the film 114 by the remaining ink.

Although it has been described that the base member 112 goes up and presses the head unit 120 in a state where the head unit 120 does not move, it is not limited thereto. Conversely, in a state where the base member 112 does not move, the head unit 120 may come down to press the base member 112. Alternatively, the base member 112 and the head unit 120 may move toward each other so that the base member 112 and the head unit 120 may be in contact with each other.

Here, referring to FIG. 4, the detection pattern 114a formed on the film 114 includes a plurality of ink marks Q spaced apart from each other, and the plurality of ink marks Q correspond to the plurality of nozzles N1 to Nn. Accordingly, as shown, the plurality of ink marks Q may form a plurality of columns L1 to L4. In FIG. 4, for example, it has been described that four ink marks Q are formed in one row L1 to L4, but the present invention is not limited thereto.

Next, based on the detection pattern 114a, the meniscus of the ink remaining in the plurality of nozzles N1 to Nn is measured (S30).

Specifically, measuring the meniscus of the remaining ink includes measuring the sizes of the plurality of ink marks Q. For example, the size of the ink mark Q may include at least one of an area, a diameter, and a radius of the ink mark Q.

The image generating unit 160 photographs the detection pattern 114a, and the control module 150 measures the size of each of the plurality of ink marks Q of the detection pattern 114a. The control module 150 separates the plurality of ink marks Q of the detection pattern 114a into virtual parts (P11 to P14 in FIG. 4). Each of the plurality of parts P11 to P14 corresponds to the plurality of nozzles N1 to Nn. The control module 150 measures the size of the ink mark Q in each part P11 to P14. The control module 150 may measure the diameter W13 of the ink mark Q in the part P13 as shown in FIG. 5.

Although it is illustrated that the ink marks Q are formed on all of the plurality of parts P11 to P14 in FIG. 4, the present invention is not limited thereto. That is, the ink mark Q may not be formed in the plurality of parts P11 to P14.

Figure 6:
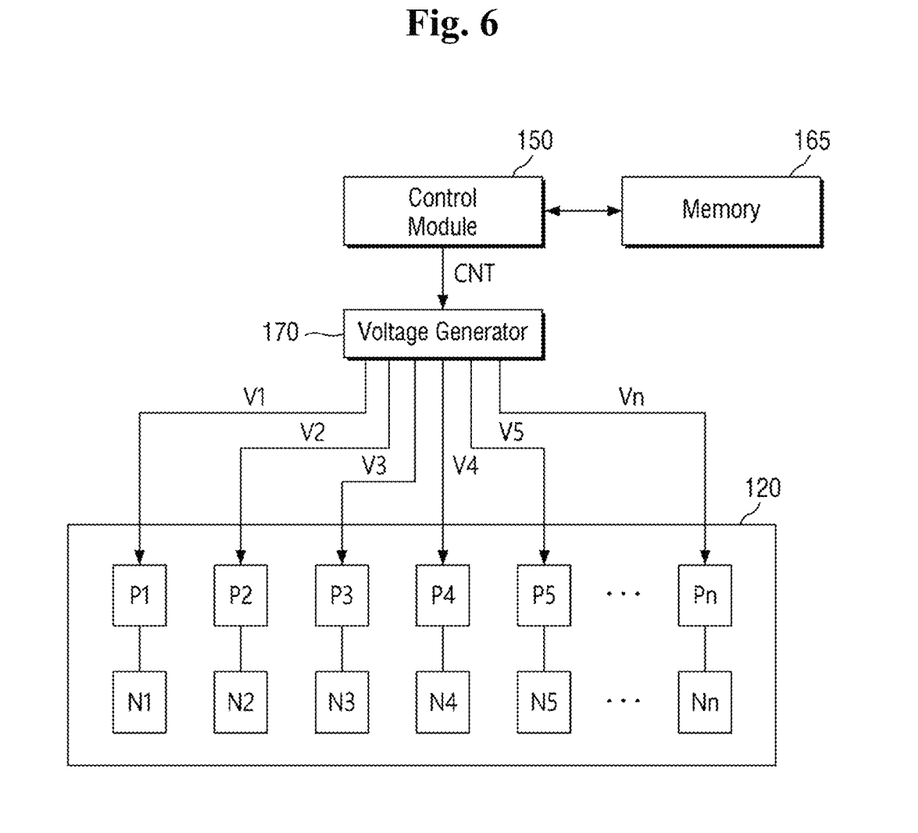
FIG. 6 is a conceptual diagram for describing an operation of a substrate processing apparatus according to an embodiment of the present invention.

FIG. 6 is a conceptual diagram for describing an operation of a substrate processing apparatus according to an embodiment of the present invention.

Referring to FIG. 6, the meniscus measured in the above-described manner is stored in the memory 165. The memory 165 stores a nozzle number (i.e., nozzle position information) and a meniscus corresponding to the nozzle number.

The head unit 120 includes a plurality of nozzles N1 to Nn and a plurality of piezoelectric elements P1 to Pn corresponding to each of the plurality of nozzles N1 to Nn.

The control module 150 may receive the meniscus measured from the memory 165 and control the ink discharged from the plurality of nozzles N1 to Nn according to the meniscus. Specifically, the control module 150 provides a control signal CNT to the voltage generating unit 170, and the voltage generating unit 170 provides voltages V1 to Vn corresponding to the plurality of nozzles N1 to Nn according to the control signal CNT. The plurality of piezoelectric elements P1 to Pn receive voltages V1 to Vn, and discharge ink through corresponding nozzles N1 to Nn.

When the meniscus M3 of the ink remaining in the third nozzle (e.g., N3) is low, the third voltage V3 provided to the third piezoelectric element P3 corresponding to the third nozzle N3 may be relatively small. On the other hand, when the meniscus M2 of the ink remaining in the second nozzle (e.g., N2) is high, the second voltage V2 provided to the second piezoelectric element P2 corresponding to the second nozzle N2 may be relatively large.

Alternatively, when the meniscus M2 of the ink remaining in the second nozzle N2 is located higher than the meniscus M3 of the ink remaining in the third nozzle N3, the second voltage provided to the second piezoelectric element P2 may be greater than the third voltage provided to the third piezoelectric element P3.

Such voltage control may be performed for each nozzle or for each nozzle group by grouping several nozzles. For example, the nozzle group may include nozzles forming one column or row.

Figure 7:
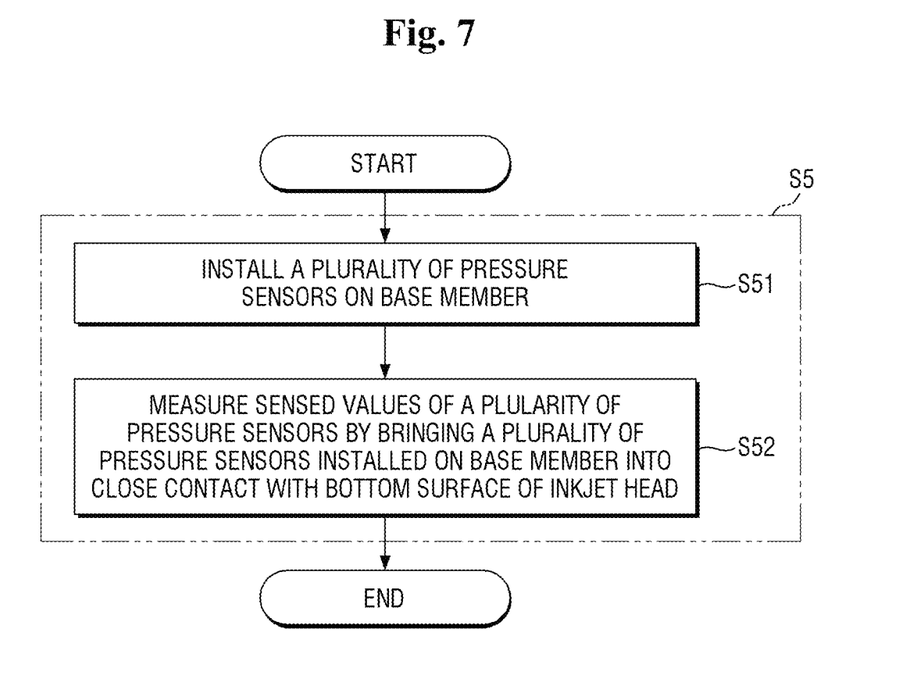
FIG. 7 is a flowchart illustrating a meniscus measuring method according to another embodiment of the present invention.
Figure 8:
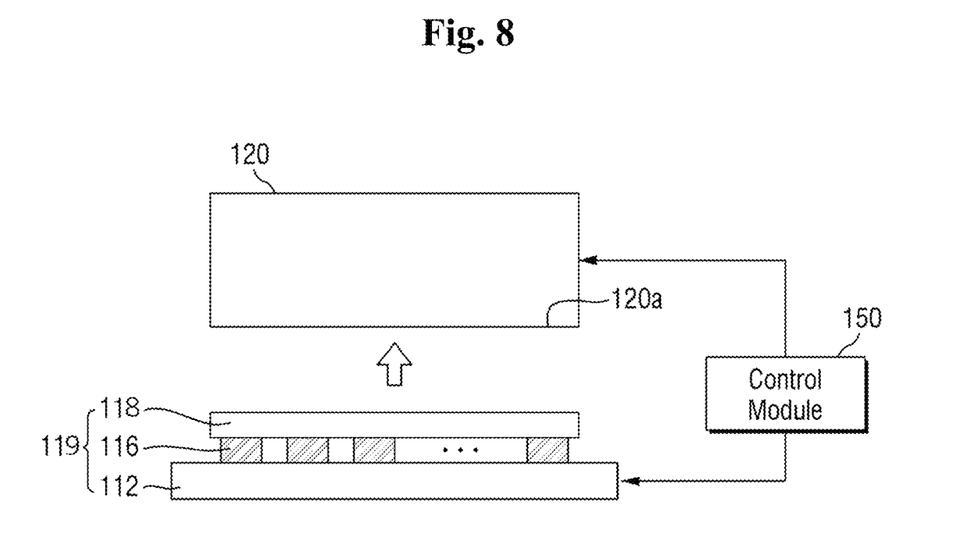
FIG. 8 is a view for describing a substrate processing apparatus according to another embodiment of the present invention.
Figure 9:
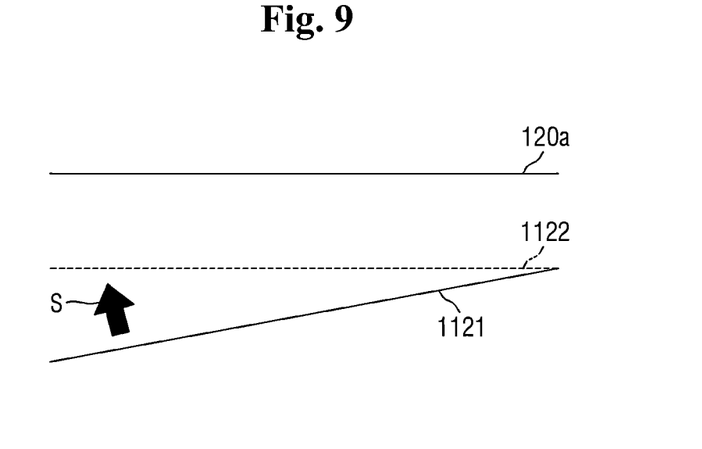
FIG. 9 is a diagram for describing a tuning method.

FIG. 7 is a flowchart for describing a meniscus measuring method according to another embodiment of the present invention. FIG. 8 is a view for describing a substrate processing apparatus according to another embodiment of the present invention. FIG. 9 is a diagram for describing a tuning method.

As described above, the film (see 114 in FIG. 1) is brought into close contact with the plurality of nozzles N1 to Nn, and the ink marks Q is formed on the film 114 by the ink remaining in the plurality of nozzles N1 to Nn. When the head unit 120 is pressed with a uniform force (or pressure) on the entire surface of the base member 112, the size of the ink mark Q is determined to be proportional to the position (or height) of the meniscus.

More specifically, even if the meniscus position (or height) of the ink remaining in a certain nozzle (for example, N1) does not change, the size of Q of the ink mark is changed according to which pressure the film 114 is in contact with the nozzle N1. This is because more ink can be absorbed into the film 114 if it comes into contact with the nozzle N1 with a greater pressure. That is, if the ink mark Q of the first size is generated when the film 114 contacts the nozzle N1 with the first pressure, the ink mark Q of a second size larger than the first size may be generated when the film 114 is in contact with the nozzle N1 with the second pressure greater than the first pressure.

Therefore, it is necessary to press the head unit 120 with a uniform force (or pressure) on the entire surface of the base member 112. To this end, before the meniscus measuring operation (that is, S10, S20, and S30 of FIG. 3), a tuning operation (see S5 of FIG. 7) need to be performed first so that the bottom surface of the head unit 120 and the top surface of the base member 112 are parallel.

Specifically, referring to FIGS. 7 and 8, a plurality of pressure sensors 116 are installed on the base member 112 (S51).

Optionally, in order to protect the plurality of pressure sensors 116, a protection member 118 may be installed on the plurality of pressure sensors 116. The pressure sensor 116 may arrange a plurality of pressure sensors 116 in a matrix form, but is not limited thereto. The protection member 118 is in the form of a film, and may be a material that does not interfere with the sensing operation of the pressure sensor 116. A member provided with a plurality of pressure sensors 116 on the base member 112 or a member provided with a plurality of pressure sensors 116 and a protection member 118 is referred to as a 'tuning member 119.'

Then, the plurality of pressure sensors 116 installed on the base member 112 are brought into close contact with the bottom surface 120a of the head unit 120 to measure the sensed values of the plurality of pressure sensors 116 (S52).

Specifically, the base member 112 presses the head unit 120 with a uniform force (or pressure) on the entire surface. The control module 150 determines whether the top surface 1121 of the base member 112 is inclined based on the sensed values measured by the plurality of pressure sensors 116 installed on the base member 112.

For example, as shown in FIG. 9, in the top surface 1121 of the base member 112, the left side may be inclined downward than the right side. In this case, even if the base member 112 presses the bottom surface of the head unit 120 with a uniform force (or pressure) on the entire surface, the sensed value at the pressure sensor 116 disposed on the left side of the base member 112 may be smaller than the sensed value at the pressure sensor 116 disposed on the right side of the base member 112.

Based on the sensed values measured in this way, it is tuned so that the top surface of the base member 112 is parallel to the bottom surface of the head unit 120. That is, it is tuned so that the position of the top surface of the base member 112 becomes from 1121 to 1122.

After the tuning is done and the plurality of pressure sensors 116 of the base member 112 are removed, a meniscus measuring unit (110 in FIG. 1) may be prepared by installing a film for measurement (see 114 in FIG. 1). Alternatively, the meniscus measurement unit 110 may be prepared by installing the film for measurement 114 on the plurality of pressure sensors 116 without removing the plurality of pressure sensors 116 of the base member 112. Subsequently, the meniscus measuring operation (S10, S20, and S30 of FIG. 3) is performed.

Figure 10:
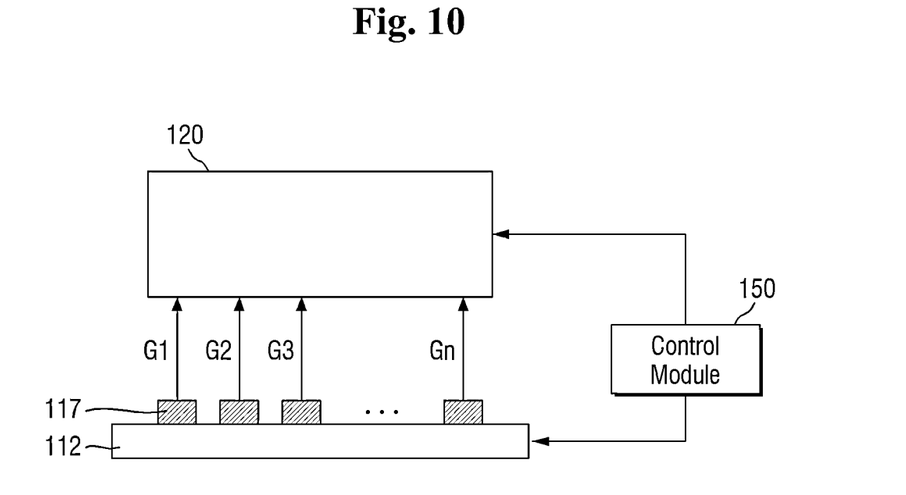
FIG. 10 is a view for describing a substrate processing apparatus according to another embodiment of the present invention.

FIG. 10 is a view for describing a substrate processing apparatus according to another embodiment of the present invention. For convenience of description, the point different from FIG. 8 will be mainly described.

The tuning member 119 used in FIG. 8 includes a plurality of pressure sensors 116 installed on the base member 112.

On the other hand, the tuning member used in FIG. 10 includes a plurality of laser displacement sensors 117 installed on the base member 112.

Distances G1 to Gn between the plurality of laser displacement sensors 117 and the bottom surface of the head unit 120 are measured using the plurality of laser displacement sensors 117.

For example, as shown in FIG. 9, on the top surface of the base member 112, the left side may be inclined downward than the right side. In this case, the distance (e.g., G1) between the laser displacement sensor 117 disposed on the left side of the base member 112 and the bottom surface of the head unit 120t may be greater than the distance (e.g., Gn) between the laser displacement sensor 117 disposed on the right side of the base member 112 and the bottom surface of the head unit 120. Based on the distances measured in this way, it is tuned so that the top surface of the base member 112 is parallel to the bottom surface of the head unit 120.

After the tuning is done and the plurality of laser displacement sensors 117 of the base member 112 are removed, the meniscus measuring unit (110 in FIG. 1) may be prepared by installing the film for measurement 114. Alternatively, the meniscus measuring unit 110 may be prepared by installing the film for measurement 114 on the plurality of laser displacement sensors 117 without removing the plurality of laser displacement sensors 117 of the base member 112. Subsequently, the meniscus measuring operation (S10, S20, and S30 of FIG. 3) is performed.

Figure 11:
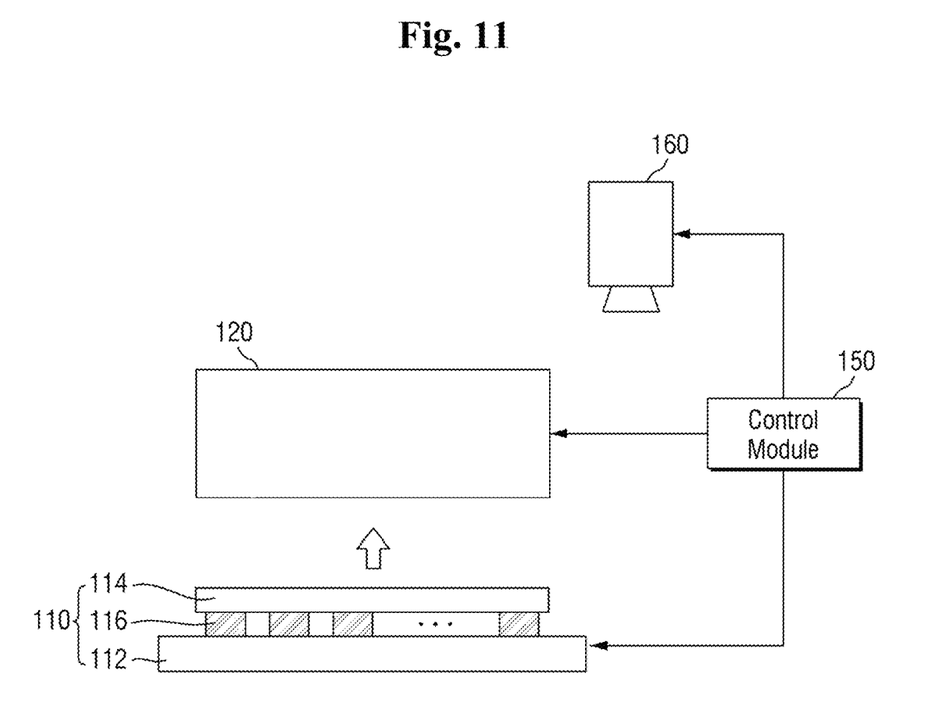
FIG. 11 is a conceptual diagram illustrating a substrate processing apparatus according to another embodiment of the present invention.

FIG. 11 is a conceptual diagram for describing a substrate processing apparatus according to another embodiment of the present invention. For convenience of description, the points different from those of FIG. 1 will be mainly described.

Referring to FIG. 11, a meniscus measuring unit 110 used in a substrate processing apparatus according to another embodiment of the present invention includes a plurality of pressure sensors 116 between the base member 112 and the film 114 installed.

Here, the pressure sensor 116 may be used during the tuning operation, as described with reference to FIG. 8.

This pressure sensor 116 may also be used during a meniscus measuring operation. As described above, a detection pattern is formed on the film 114 by pressing the base member 112 to the head unit 120 with a uniform force (or pressure) on the entire surface. When forming the detection pattern, the sensed values are measured using a plurality of pressure sensors 116. Based on the sensed value measured in this way, the validity of the detection pattern is checked. If the sensed values sensed by the plurality of pressure sensors 116 are within the reference range (i.e., the initially set range), it may be determined that the detection pattern is valid. If at least some of the sensed values sensed by the plurality of pressure sensors 116 are out of the reference range, it may be determined that the detection pattern is not valid. If the detection pattern is not valid, the meniscus measuring operation is performed again. If the detection pattern is not valid even after repeating several times, the tuning operation is performed again.

Although embodiments of the present invention have been described with reference to the above and the accompanying drawings, those skilled in the art, to which the present invention pertains, can understand that the present invention may be practiced in other specific forms without changing its technical spirit or essential features. Therefore, it should be understood that the embodiments described above are illustrative in all respects and not limiting.

What is claimed is:

1. A method for measuring a meniscus comprising:
providing a head unit capable of discharging ink through a plurality of nozzles;
adhering ink that is left over in the plurality of nozzles after a previous completed discharge by the head unit to a film to form a detection pattern on the film by bringing the film into close contact with the plurality of nozzles, the adhering being performed without an active discharge of the ink that is left over by the head unit when the film is brought into the close contact with the plurality of nozzles; and
measuring a meniscus of the ink that is left over in the plurality of nozzles after the previous completed discharge by the head unit based on the detection pattern.

2. The method of claim 1,
wherein the detection pattern includes a plurality of ink marks spaced apart from each other, and the plurality of ink marks correspond to the plurality of nozzles, and
wherein measuring the meniscus of the ink that is left over in the plurality of nozzles after the previous completed discharge by the head unit comprises measuring a size of the ink mark.

3. The method of claim 2, wherein the size of the ink mark includes at least one of an area, a diameter, and a radius of the ink mark.

4. The method of claim 1,
wherein the head unit includes the plurality of nozzles and a plurality of piezoelectric elements corresponding to each of the plurality of nozzles, and
the method further comprises adjusting a voltage provided to the plurality of piezoelectric elements according to the measured meniscus.

5. The method of claim 4,
wherein the head unit includes a first nozzle, a second nozzle, a first piezoelectric element corresponding to the first nozzle, and a second piezoelectric element corresponding to the second nozzle,
wherein a meniscus of ink that is left in the first nozzle after the previous completed discharge by the head unit is located higher than a meniscus of ink that is left in the second nozzle after the previous completed discharge by the head unit, and
wherein a first voltage provided to the first piezoelectric element is greater than a second voltage provided to the second piezoelectric element.

6. The method of claim 1,
wherein bringing the film into close contact with the plurality of nozzles comprises bringing a base member, on which the film is installed, into close contact with the head unit, and
the method further comprises tuning so that a bottom surface of the head unit and a top surface of the base member are parallel before bringing the film into close contact with the plurality of nozzles.

7. The method of claim 6, wherein the tuning comprises:
installing a plurality of pressure sensors on the base member before the film is installed,
measuring sensed values of the plurality of pressure sensors by bringing the plurality of pressure sensors installed on the base member into close contact with a bottom surface of the head unit, and
tuning so that a bottom surface of the head unit and a top surface of the base member are parallel based on the measured sensed values.

8. The method of claim 6, wherein the tuning comprises,
installing a plurality of laser displacement sensors on the base member,
measuring distances between the plurality of laser displacement sensors and a bottom surface of the head unit using the plurality of laser displacement sensors installed on the base member,
tuning so that a bottom surface of the head unit and a top surface of the base member are parallel based on the measured distances.

9. The method of claim 1, wherein the ink that is left over in the plurality of nozzles after the previous completed discharge by the head unit is contained within and does not extend out of an opening of each of the plurality of nozzles.

10. The method of claim 1, wherein the meniscus of the ink that is left over in the plurality of nozzles after the previous completed discharge by the head unit is a concave meniscus.

11. An apparatus for measuring a meniscus comprising:
a base member;
a pressure sensor installed on the base member; and
a film installed on the pressure sensor,
wherein the film is in close contact with a plurality of nozzles of a head unit so that ink that is left over in the plurality of nozzles after a previous completed discharge by the head unit is adhered to the film to form a detection pattern on the film, the ink that is left over in the plurality of nozzles is adhered to the film without an active discharge of the ink that is left over by the head unit when the film is in the close contact with the plurality of nozzles.

12. The apparatus of claim 11, wherein the film has an absorbent material capable of absorbing ink remaining in the plurality of nozzles.

13. An apparatus for processing a substrate comprising:
a head unit capable of discharging ink through a plurality of nozzles;
a measuring unit including a film for measuring a meniscus of ink that is left over in the plurality of nozzles after a previous completed discharge by the head unit; and
a control module for controlling the head unit or the measuring unit to bring the film into close contact with the plurality of nozzles, adhering the ink that is left over in the plurality of nozzles after the previous completed discharge by the head unit to the film to form a detection pattern on the film, and calculating a meniscus of the ink that is left over in the plurality of nozzles after the previous completed discharge by the head unit based on the detection pattern, the adhering being performed without an active discharge of the ink that is left over by the head unit when the film is brought into the close contact with the plurality of nozzles.

14. The apparatus of claim 13,
wherein the detection pattern includes a plurality of ink marks spaced apart from each other, and the plurality of ink marks correspond to the plurality of nozzles,
wherein the apparatus further comprises an image generating unit for photographing the detection pattern, and
wherein calculating, by the control module, the meniscus of the ink that is left over in the plurality of nozzles after the previous completed discharge by the head unit comprises calculating, by the control module, sizes of the plurality of ink marks from the photographed detection pattern.

15. The apparatus of claim 14, wherein the size of the ink mark includes at least one of an area, a diameter, and a radius of the ink mark.

16. The apparatus of claim 13,
wherein the head unit comprises the plurality of nozzles and a plurality of piezoelectric elements corresponding to each of the plurality of nozzles, and
wherein the control module adjusts a voltage provided to the plurality of piezoelectric elements according to the measured meniscus.

17. The apparatus of claim 16,
wherein the head unit comprises a first nozzle, a second nozzle, a first piezoelectric element corresponding to the first nozzle, and a second piezoelectric element corresponding to the second nozzle,
wherein a meniscus of ink that is left in the first nozzle after the previous completed discharge by the head unit is located higher than a meniscus of ink that is left in the second nozzle after the previous completed discharge by the head unit, and
wherein the control module controls such that a first voltage is provided to the first piezoelectric element and a second voltage greater than the first voltage is provided to the second piezoelectric element.

18. The apparatus of claim 13,
wherein the measuring unit comprises a base member and the film installed on the base member, and
wherein tuning is performed so that a bottom surface of the head unit and a top surface of the base member are parallel before bringing the film into close contact with the plurality of nozzles.

19. The apparatus of claim 18, wherein the tuning comprises:
installing a plurality of pressure sensors on the base member before the film is installed,
measuring sensed values of the plurality of pressure sensors by bringing the plurality of pressure sensors installed on the base member into close contact with a bottom surface of the head unit,
tuning so that a bottom surface of the head unit and a top surface of the base member are parallel based on the measured sensed values,
wherein the film is installed on the base member after the tuning is performed.

20. The apparatus of claim 18, wherein the tuning comprises,
installing a plurality of laser displacement sensors on the base member before the film is installed,
measuring distances between the plurality of laser displacement sensors and a bottom surface of the head unit using the plurality of laser displacement sensors installed on the base member,
tuning so that a bottom surface of the head unit and a top surface of the base member are parallel based on the measured distances,
wherein the film is installed on the base member after the tuning is performed.

* * * * *